United States Patent [19]

Schlecker

[11] Patent Number: 5,393,598
[45] Date of Patent: * Feb. 28, 1995

[54] MULTI-LAYERED INSULATING COMPOSITE FABRIC

[76] Inventor: Richard A. Schlecker, 702 D Pulaski Hwy., Joppa, Md. 21085

[*] Notice: The portion of the term of this patent subsequent to Feb. 1, 2011 has been disclaimed.

[21] Appl. No.: 119,846

[22] Filed: Sep. 13, 1993

Related U.S. Application Data

[63] Continuation-in-part of Ser. No. 900,014, Jun. 17, 1992, Pat. No. 5,283,111.

[51] Int. Cl.⁶ .................... B32B 7/00; B32B 3/26; D04H 1/00
[52] U.S. Cl. ............................ 428/247; 428/102; 428/246; 428/285; 428/286; 428/314.4; 428/316.6
[58] Field of Search ............. 428/247, 246, 285, 286, 428/287, 102, 314.4, 316.6

[56] References Cited

U.S. PATENT DOCUMENTS

| | | | |
|---|---|---|---|
| 2,932,304 | 4/1960 | Voege et al. | 135/97 |
| 2,942,327 | 6/1960 | Corry | 28/80 |
| 3,598,133 | 8/1971 | Abert | 135/94 |
| 3,718,528 | 2/1973 | Bergstrom | 428/247 |
| 3,867,244 | 2/1975 | Adams | 428/314.4 |
| 4,065,889 | 1/1978 | Fraioli | 52/2.23 |
| 4,252,850 | 2/1981 | de Winter | 428/131 |
| 4,391,865 | 7/1983 | Constance | 428/74 |
| 4,397,346 | 8/1983 | Chumbley et al. | 16/84.1 R |
| 4,486,492 | 12/1984 | Ziliotto | 428/252 |
| 4,500,592 | 2/1985 | Lee et al. | 428/251 |
| 4,529,633 | 7/1985 | Karlsson | 428/17 |
| 4,569,874 | 2/1986 | Kuznetz | 428/109 |
| 4,608,298 | 8/1986 | Klaff | 428/246 |
| 4,705,717 | 11/1987 | Cain et al. | 428/252 |
| 5,100,725 | 3/1992 | Pearson | 428/314.4 |
| 5,283,111 | 2/1994 | Schecker | 428/247 |

FOREIGN PATENT DOCUMENTS

| | | | |
|---|---|---|---|
| 3019187 | 7/1981 | Germany | 428/314.4 |
| 110983 | 6/1985 | Japan | 428/314.4 |

*Primary Examiner*—George F. Lesmes
*Assistant Examiner*—Terrel Morris
*Attorney, Agent, or Firm*—Watson, Cole, Grindle & Watson

[57] ABSTRACT

Insulating composite fabrics for use with livestock containment facilities in providing protection from the weather. The composites are a foldable construction of opposite side layers each of which includes a waterproof synthetic polymeric resin fabric. The interior layers include combinations of insulating materials and metallized reflective sheets which allow the composites to contain heat within the livestock containment facility. The insulating layers are formed of closed cell foam material such as polypropylene, polyethylene and polystyrene.

4 Claims, 2 Drawing Sheets

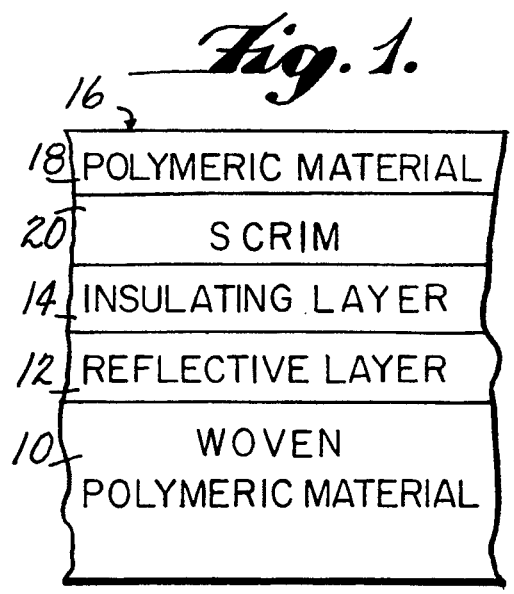
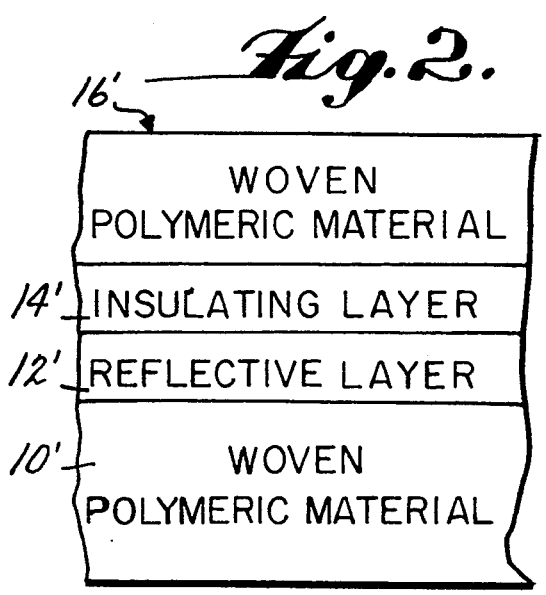
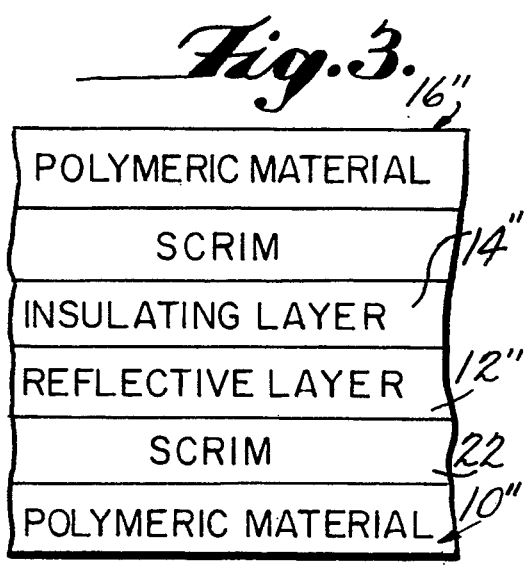
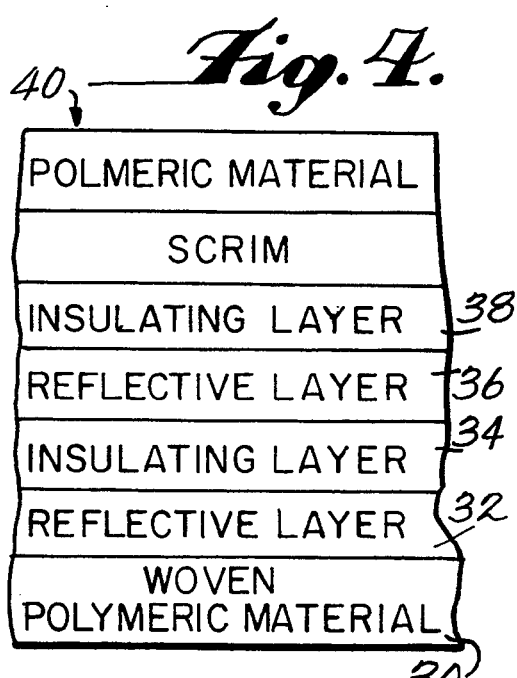
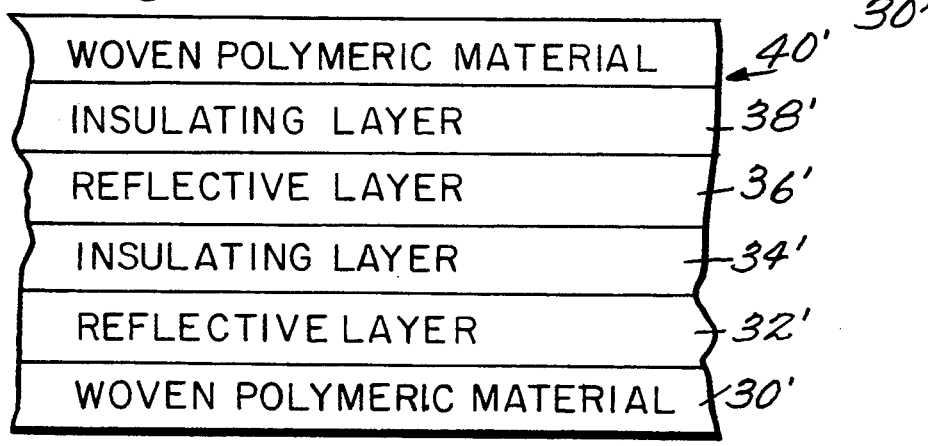

MULTI-LAYERED INSULATING COMPOSITE FABRIC

CROSS-REFERENCE TO RELATED APPLICATION

This application is a continuation-in part of U.S. patent application Ser. No. 07/900,014, filed Jun. 17, 1992, now U.S. Pat. No. 5,283,111.

BACKGROUND OF THE INVENTION

The present invention relates to an insulating composite fabric for use with livestock containment facilities such as a hen house or the like. Such facilities have window openings therein, and chicken wire is used to close the openings, but no glass or other means is employed to provide protection from the weather. It is particularly important to provide an insulation means for closing such openings in colder weather.

The invention insulation means is utilized to close such openings, the insulation means being in the form of a composite panel which is normally stored on the exterior of the facility in folded position adjacent the bottom of an opening. Accordingly, the panel should be vertically foldable, so that it can be unfolded from the stored position and pulled upwardly to seal off the opening whereupon it is attached in operative position. When it is desired to remove the panel from its operative position over the opening, it is lowered and vertically folded until it returns into its stored position.

The exterior of the panel is exposed to the elements, and accordingly it is important that it be waterproof and not subject to deterioration due to the effects of the sun. The interior of the panel engages the chicken wire as it moves relative thereto, thereby causing abrasion. It is therefore important that the inner surface of the panel be formed of a material which is abrasion resistant and which will have a long life even when subjected to abrasion. Additionally, the inner surface of the panel may be splashed with water from inside the facility when the facility is being cleaned, and it is desirable that this inner surface also be waterproof.

The present invention represents an improvement over the prior art composite fabric disclosed in U.S. Pat. No. 4,608,298 which is employed for the same purpose. In the patented construction, the outer layer exposed to the elements is composed of a knitted textile fabric having tightly interlaced synthetic textile yarns. The knit is a warp knit, and the fibers of the yarns may be nylon, vinyl, rayon, polyester or polyolefin textile yarns. The knit is tight in order to provide water-repellency properties and to minimize the amount of wind blown rain which might be driven through the knitted fabric. However, it is impossible to provide a waterproof outer surface with this construction, and water will penetrate the composite fabric through the outer surface of the fabric.

In addition, this prior art composite fabric employs an inner surface of the same construction as the outer surface. As discussed above, such inner surface is not waterproof as is desirable. Furthermore, this knitted textile fabric arrangement does not have good abrasion resistance characteristics, and therefore it may wear out prematurely.

SUMMARY OF THE INVENTION

The invention includes various forms of composite fabric which may be used for closing openings in livestock containment facilities, and in addition, a composite fabric is provided which may be used as a divider curtain within such a facility.

The fabrics utilized for closing openings include opposite side layers each of which includes a waterproof synthetic polymeric resin fabric. This ensures that the fabric composite will be able to resist damage due to rain and snow. The outer surface of the fabric composite is preferably formed of polyvinyl chloride which is waterproof and which does not deteriorate when subjected to the rays of the sun. The inner surface of the fabric composite is preferably formed of a woven polymeric resin of polyethylene or polypropylene. These materials are both translucent and resistant to abrasion.

A reflective layer including a metallized reflective surface is disposed adjacent the translucent inner layer of the composite. With this unique combination of elements, infrared heat is transmitted through the translucent layer and is reflected back through the translucent layer into the interior of the facility to assist in retaining the heat within the facility in cold weather. A non-woven batt of insulating textile fibers is disposed adjacent to the reflective layer and between the reflective layer and the outer layer of the fabric composite to enhance the insulating properties of the invention. In other forms of the invention, the insulating layer is of different construction. The layer of non-woven batt construction is eliminated and replaced with a layer of closed cell foam made of polypropylene, polyethylene or polystyrene. This layer of closed cell foam has better insulating characteristics and absorbs less moisture than a layer of non-woven batt construction.

In modified forms of the invention, the inner and outer layers of the fabric composite may be of the same construction. Accordingly, the inner and outer layers may both be formed of a substantially waterproof synthetic polymeric resin fabric, or they may both be formed of a woven polymeric resin of polyethylene or polypropylene.

In further modified forms of the invention, an additional reflective layer and an additional insulating layer are provided to further increase the insulating characteristics of the invention.

In the composite fabric used as a divider curtain, both the inner and outer layers are preferably formed of a woven polymeric resin of polyethylene or polypropylene, such layers both being translucent. A reflective layer is disposed adjacent each of the inner and outer layers so that infrared heat passes through the inner and outer layers and is reflected by the reflective layer back through the adjacent layers into the interior of the facility within which the divider curtain is supported. An insulating layer including a non-woven batt of insulating textile fibers is disposed between the reflective layers in this form of the invention. In another form of a divider curtain, the layer of non-woven batt construction is replaced with a layer of closed cell foam made of polypropylene, polyethylene or polystyrene.

BRIEF DESCRIPTION OF THE DRAWINGS

FIG. 1 is a schematic cross-section through a first form of the invention;

FIG. 2 is a schematic cross-section through a second form of the invention;

FIG. 3 is a schematic cross-section through a third form of the invention;

FIG. 4 is a schematic cross-section through a fourth form of the invention;

FIG. 5 is a schematic cross-section through a fifth form of the invention;

DESCRIPTION OF THE PREFERRED EMBODIMENTS

Figure 6:
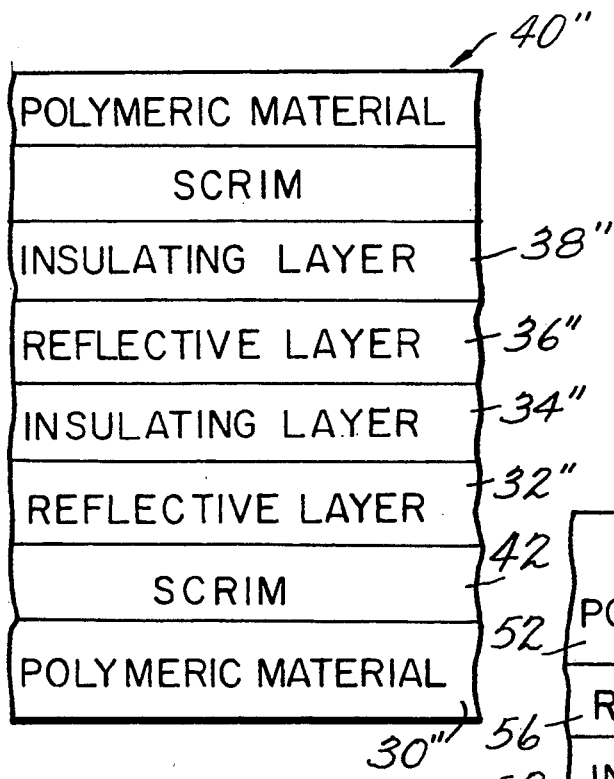
FIG. 6 is a schematic cross-section through a sixth form of the invention.

Referring now to FIG. 1 of the drawing, the composite fabric of this form of the invention includes an inner side layer 10 formed of a waterproof synthetic polymeric resin fabric. This fabric is woven from flattened tapes preferably composed of polyethylene or polypropylene. The tapes are coated with a film of material corresponding to the material of the tapes, to thereby make the woven fabric waterproof.

A second layer 12 is disposed adjacent layer 10 and comprises a reflective layer for reflecting infrared heat. Layer 12 is preferably formed of a sheet of material such as polyester or polyethylene having aluminum vacuum deposited thereon. Accordingly, this layer includes a metallized reflective surface which has low emissivity.

A third layer 14 forms an insulation layer and comprises a non-woven batt of insulating textile fibers. These fibers may formed, for example, of polyesters, polyolefins, rayons, nylon or glass, and mixtures thereof. The batt may be a simply laid batt or a laid and needled batt. This layer has many air spaces to enhance the insulation properties thereof. The batt may include a scrim, formed for example of polyester, with the fibers of the batt needle punched into the scrim. In another form of the invention, insulating layer 14 of non-woven batt construction is replaced with a layer of closed cell foam made of polypropylene, polyethylene or polystyrene.

An outer side layer indicated generally by reference character 16 comprises a waterproof synthetic polymeric resin fabric. This fabric preferably comprises a thin sheet of polyvinyl chloride 18 which is adhesively bonded to a scrim 20 which may be formed of polyester. This outer layer may also include thin sheets of polyvinyl chloride on opposite sides of the scrim and adhesively bonded thereto.

Figure 8:
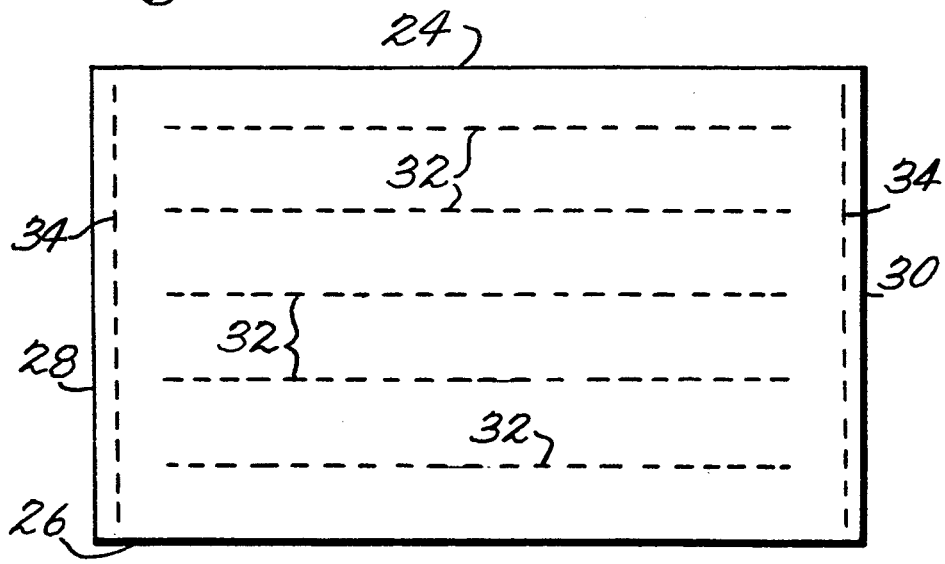
FIG. 8 is a front view of a panel formed of the invention composite fabric, shown in a vertically supported position.

Securing means is provided for securing the layers in operative relationship to one another. As seen in FIG. 8, a panel 22 of the composite fabric material of the invention is seen as being supported in vertical position. The panel includes top and bottom edges 24 and 26 as well as opposite side edges 28 and 30. The layers of the panel are secured together by rows of stitches composed of synthetic textile yarns such as polyester, polyolefin and nylon yarns. The rows include at least horizontally disposed rows 32 which are substantially parallel with the upper and lower edges of the panel. Rows 32 are suitably spaced from one another, and the number thereof will vary. In a typical example, the rows may be about four inches apart. It will be appreciated that these horizontal rows of stitches allow the fabric composite to be folded to vertically gather the composite as it moves in a vertical direction. The panel may also include vertical rows of stitches 34 extending substantially parallel with the side edges of the panel. This form of composite fabric may have a thickness of about ½ inch.

It should be further understood that similar rows of stitches may also be employed in the following forms of the invention in order to retain the layers in operative relationship to one another. Accordingly, no further discussion of the rows of stitches in the following modifications of the invention is necessary.

Referring to FIG. 2, a construction is shown wherein components similar to those shown in FIG. 1 are given the same reference numerals primed. Layers 10', 12' and 14' are identical to layers 10, 12 and 14 of FIG. 1. However, in this form of the invention, layer 16' is identical in construction with layer 10'. In another form of the invention, the insulating layer 14' of non-woven batt construction is replaced with a layer of closed cell foam made of polypropylene, polyethylene or polystyrene.

Referring to FIG. 3, a construction is shown wherein components similar to those shown in FIG. 1 are given the same reference numerals double primed Layers 12", 14" and 16" are identical to layers 12, 14 and 16 of FIG. 1. However, in this form of the invention, layer 10" is identical in construction with layer 16", the only difference being that the scrim 22 of layer 10" is on the upper surface of the layer rather than on the lower surface as is the case with layer 16". In another form of the invention, the insulating layer 14" of non-woven batt construction is replaced with a layer of closed cell foam made of polypropylene, polyethylene or polystyrene.

Referring now to FIG. 4, a further form of the invention includes a first inner side layer 30, and adjacent reflective layer 32 and an adjacent insulating layer 34. These layers are identical in construction respectively to layers 10, 12 and 14 of FIG. 1. A further reflective layer 36 is disposed adjacent layer 34, and a further insulating layer 38 is disposed adjacent layer 36. Layers 36 and 38 are identical in construction with layers 32 and 34 respectively. An outer side layer 40 is identical in construction to layer 16 of FIG. 1. This form of composite fabric may have a thickness of about ⅜ inch. In another form of the invention, the insulating layers 34 and 38 of non-woven batt construction are each replaced with a layer of closed cell foam made of polypropylene, polyethylene or polystyrene.

Referring to FIG. 5, a construction is shown wherein components similar to those shown in FIG. 4 are given the same reference numerals primed. Layers 30', 32', 34', 36' and 38' are identical to layers 30, 32, 34, 36 and 38 of FIG. 4. However, in this form of the invention, layer 40' is identical in construction with layer 30'. In another form of the invention, the insulating layers 34' and 38' of non-woven batt construction are each replaced with a layer of closed cell foam made of polypropylene, polyethylene or polystyrene.

Referring to FIG. 6, a construction is shown wherein components similar to those shown in FIG. 4 are given the same reference numerals double primed. Layers 32", 34", 36", 38" and 40" are identical to layers 32, 34, 36, 38 and 40 of FIG. 4. However, in this form of the invention, layer 30" is identical in construction with layer 40" the only difference being that the scrim 42 of the layer 30" is on the upper surface of the layer rather than on the lower surface of the layer as is the case with layer 40". In another form of the invention, the insulating layers 34" and 38" of non-woven batt construction are each replaced with a layer of closed cell foam made of polypropylene, polyethylene or polystyrene.

Figure 7:
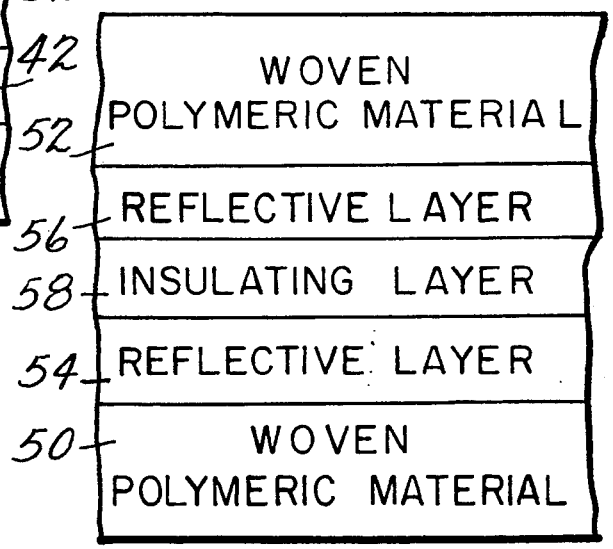
FIG. 7 is a schematic cross-section through a seventh form of the invention.

Referring now to FIG. 7, a further modified form of the invention is disclosed which can serve as a divider curtain. In this form of the invention, opposite side layers 50 and 52 of the fabric composite are formed of a waterproof woven synthetic polymeric resin fabric, and preferably are composed of polyethylene or polypropylene. These side layers are identical in construction to layer 10 of FIG. 1. The composite fabric also includes a pair of reflective layers 54 and 56 disposed adjacent layers 50 and 56 respectively. Layers 54 and 56 are identical in construction to layer 12 of FIG. 1. An insulating layer 58 is adjacent to and disposed between layers 54 and 56. Layer 58 is identical in construction to layer 14 of FIG. 1. In another form of the invention, the insulating layer 58 of non-woven batt construction is replaced with a layer of closed cell foam made of polypropylene, polyethylene or polystyrene.

The construction shown in FIG. 7 can be used as a divider curtain, whereby infrared heat impinging on the curtain from either side thereof can pass through the translucent side layer and be reflected back through such side layer by the adjacent reflective layer, thereby retaining heat on each side of the divider curtain. The central insulating layer enhances the insulating effect of the curtain to retain heat on either side of the curtain.

The invention has been described with reference to preferred embodiments. Obviously, modifications, alterations and other embodiments will occur to others upon reading and understanding this specification. It is my intention to include all such modifications, alterations and alternate embodiments insofar as they come within the scope of the appended claims or the equivalent thereof.

What is claimed is:

1. A multi-layered insulating composite fabric for use with a livestock containment facility comprising, waterproof inner and outer opposite side layers, said inner side layer comprising a woven fabric formed entirely of flattened translucent plastic tapes coated with a film of material corresponding to the material of the tapes to thereby make the woven fabric waterproof, a reflective layer disposed adjacent to and outwardly of said inner side layer and having a metallized reflective surface of low emissivity, an insulating layer disposed adjacent to and outwardly of said reflective layer, said insulating layer comprising closed cell foam material wherein said material comprises one member selected from the group consisting of polypropylene, polyethylene and polystyrene, said outer side layer being disposed outwardly of said insulating layer, said outer side layer comprising a waterproof synthetic polymeric resin fabric, and securing means for securing said layers of material in operative relationship to one another.

2. A multi-layered insulating composite fabric for use with a livestock containment facility comprising, waterproof inner and outer opposite side layers, said inner side layer comprising a woven fabric formed entirely of flattened translucent plastic tapes coated with a film of material corresponding to the material of the tapes to thereby make the woven fabric waterproof, a reflective layer disposed adjacent to and outwardly of said inner side layer and having a metallized reflective surface of low emissivity, an insulating layer disposed adjacent to and outwardly of said reflective layer, said insulating layer comprising closed cell foam material wherein said material comprises one member selected from the group consisting of polypropylene, polyethylene and polystyrene, said outer side layer being disposed adjacent to and outwardly of said insulating layer, said outer side layer comprising a thin sheet of polyvinyl chloride adhesively bonded to a scrim, and securing means for securing said layers of material in operative relationship to one another.

3. A multi-layered insulating composite fabric for use with a livestock containment facility comprising, waterproof inner and outer opposite side layers, said inner side layer comprising a woven fabric formed entirely of flattened translucent plastic tapes coated with a film of material corresponding to the material of the tapes to thereby make the woven fabric waterproof, a reflective layer disposed adjacent to and outwardly of said inner side layer and having a metallized reflective surface of low emissivity, an insulating layer disposed adjacent to and outwardly of said reflective layer, said insulating layer comprising closed cell foam material wherein said material comprises one member selected from the group consisting of polypropylene, polyethylene and polystyrene, a further reflective layer disposed adjacent to and outwardly of said insulating layer and having a metallized reflective surface of low emissivity, a further insulating layer disposed adjacent to and outwardly of said further reflective layer, said further insulating layer comprising closed cell foam material wherein said material comprises one member selected from the group consisting of polypropylene, polyethylene and polystyrene, said outer side layer being disposed outwardly of said further insulating layer, said outer side layer comprising a thin sheet of polyvinyl chloride adhesively bonded to a scrim, and securing means for securing said layers of material in operative relationship to one another.

4. A multi-layered insulating composite fabric for use with a livestock containment facility comprising, waterproof inner and outer opposite side layers, said inner side layer comprising a woven fabric formed entirely of flattened translucent plastic tapes coated with a film of material corresponding to the material of the tapes to thereby make the inner side layer waterproof, a reflective layer disposed adjacent to and outwardly of said inner side layer and having a metallized reflective surface of low emissivity, an insulating layer disposed adjacent to and outwardly of said reflective layer, said insulating layer comprising closed cell foam material wherein said material comprises one member selected from the group consisting of polypropylene, polyethylene and polystyrene, a further reflective layer disposed adjacent to and outwardly of said insulating layer and having a metallized reflective surface of low emissivity, said outer side layer being disposed adjacent to and outwardly of said further reflective layer, said outer side layer comprising a woven fabric formed entirely of flattened translucent plastic tapes coated with a film of material corresponding to the material of the tapes to thereby make the outer side layer waterproof, and securing means for securing said layers of material in operative relationship to one another.

* * * * *